(12) United States Patent
Yun et al.

(10) Patent No.: US 7,135,254 B2
(45) Date of Patent: *Nov. 14, 2006

(54) MULTI-LAYERED, UV-CURED POLYMER ELECTROLYTE AND LITHIUM SECONDARY BATTERY COMPRISING THE SAME

(75) Inventors: Kyung-Suk Yun, Seoul (KR); Byung-Won Cho, Seoul (KR); Won-Il Cho, Seoul (KR); Hyung-Sun Kim, Seoul (KR); Un-Sek Kim, Seoul (KR); Hee-Woo Rhee, Seoul (KR); Yong-Tae Kim, Seoul (KR)

(73) Assignee: Korea Institute of Science and Technologies, Seoul (KR)

( * ) Notice: Subject to any disclaimer, the term of this patent is extended or adjusted under 35 U.S.C. 154(b) by 487 days.

This patent is subject to a terminal disclaimer.

(21) Appl. No.: 10/275,383

(22) PCT Filed: Jan. 31, 2001

(86) PCT No.: PCT/KR01/00133

§ 371 (c)(1), (2), (4) Date: May 22, 2003

(87) PCT Pub. No.: WO02/061874

PCT Pub. Date: Aug. 8, 2002

(65) Prior Publication Data

US 2003/0180623 A1  Sep. 25, 2003

(51) Int. Cl.
*H01M 6/18* (2006.01)

(52) U.S. Cl. ............... 429/317; 429/309; 429/314; 429/316; 429/307; 429/144; 252/62.2

(58) Field of Classification Search ............... 429/309, 429/314, 316, 317, 307, 144; 252/62.2
See application file for complete search history.

(56) References Cited

U.S. PATENT DOCUMENTS 5,571,392 A * 11/1996 Sato et al. .............. 252/62.2

FOREIGN PATENT DOCUMENTS

JP      2000-133308      *    5/2000

* cited by examiner

Primary Examiner—Laura Weiner
(74) Attorney, Agent, or Firm—Morrison & Foerster LLP

(57) ABSTRACT

The present invention relates to a multi-layered, UV-cured polymer electrolyte and lithium secondary battery comprising the same, wherein the polymer electrolyte comprises: A) a separator layer formed of polymer electrolyte, PP, PE, PVdF or non-woven fabric, wherein the separator layer having two surfaces; B) at least one gelled polymer electrolyte layer located on at least one surface of the separator layer comprising: a) polymer obtained by curing ethyleneglycoldi(meth)acrylate oligomer of the formula (I) by UV irradiation: $CH_2=CR^1COO(CH_2CH_2O)_nCOCR^2=CH_2$ wherein, $R^1$ and $R^2$ are independently hydrogen or methyl group, and n is a integer of 3–20; and b) at least one polymer selected from the group consisting of PVdF-based polymer, PAN-based polymer, PMMA-based polymer and PVC-based polymer; and C) organic electrolyte solution in which lithium salt is dissolved in a solvent.

16 Claims, 6 Drawing Sheets

MULTI-LAYERED, UV-CURED POLYMER ELECTROLYTE AND LITHIUM SECONDARY BATTERY COMPRISING THE SAME

TECHNICAL FIELD

The present invention relates to a multi-layered, ultraviolet (hereinafter referred to as "UV")-cured polymer electrolyte and a lithium secondary battery comprising the same. More specifically, the polymer electrolyte comprises:
A) a separator film layer formed of a polymer electrolyte, PP, PE, PVdF or a non-woven fabric;
B) a UV-cured polymer electrolyte layer comprising:
  a) a polymer obtained by curing ethyleneglycoldi(meth)acrylate oligomer of formula (I) with an irradiation of UV rays,

wherein, $R^1$ and $R^2$ are independently hydrogen or methyl group, and n is an integer of 3–20, and
  b) at least one polymer selected from the group consisting of polyvinylidenefluoride group polymer, polyacrylonitrile group polymer, polymethylmethacrylate group polymer and polyvinylchloride group polymer; and
C) an organic electrolyte solution in which a lithium salt is dissolved in an organic solvent.

BACKGROUND ART

Recently, concomitant with miniaturization and lightweight trends in electronic appliances, research into energy sources having high density and high energy has been performed intensively. A lithium secondary battery has been proposed as one energy source in the aspect that the higher integration of energy is possible because the molecular weight of lithium used in a lithium secondary battery is very low, but its density is relatively high.

In the earlier developed lithium secondary battery, an anode was fabricated with metallic lithium or lithium alloy. However, a cycle characteristic of such secondary battery using metallic lithium or lithium alloy is reduced significantly due to dendrites generated on an anode in the course of repeated charging and discharging of the battery.

A lithium ion battery was presented in order to solve the problem of dendrite generation. The lithium ion battery developed by SONY Company in Japan and widely used all over the world comprises an anode active material, a cathode active material, an organic electrolyte and a separator film.

The separator film functions to prevent an internal short-circuiting of the lithium ion battery caused by contacting of a cathode and an anode, and to permeate ions. Separator films generally used at the present time are polyethylene (hereinafter referred to as "PE") or polypropylene (hereinafter referred to as "PP") separator films. However, the lithium ion battery using the PE or PP separator film has problems such as instability of a battery, intricacy of its fabrication process, restriction on battery shape and limitation of high capacity. There have been attempts to solve the above-mentioned problems, but there is no clear result until now.

On the contrary, a lithium polymer battery uses a polymer electrolyte having two functions, as a separator film and as an electrolyte at the same time, and it is now being viewed with keen interest as a battery being able to solve all of the problems. The lithium polymer battery has an advantage in view of productivity because the electrodes and a polymer electrolyte can be laminated in a flat-plate shape and its fabrication process is similar to a fabrication process of a polymer film.

A conventional polymer electrolyte is mainly prepared with polyethylene oxide (hereinafter referred to as "PEO"), but its ionic conductivity is merely $10^{-8}$ S/cm at room temperature, and accordingly it can not be used commonly.

Recently, a gel or hybrid type polymer electrolyte having an ionic conductivity above $10^{-3}$ S/cm at room temperature has been developed.

K. M. Abraham et al. and D. L. Chua et al. disclose a polymer electrolyte of a gel type polyacrylonitrile (hereinafter referred to as "PAN") group in U.S. Pat. No. 5,219,679 and in U.S. Pat. No. 5,240,790 respectively. The gel type PAN group polymer electrolyte is prepared by injecting a solvent compound (hereinafter referred to as an "organic electrolyte") prepared with a lithium salt and organic solvents, such as ethylene carbonate and propylene carbonate, etc. into a polymer matrix. It has the advantages that the contact resistance is small in charging/discharging of a battery and desorption of the active materials rarely takes place because the adhesive force of the polymer electrolyte is good, and accordingly adhesion between a composite electrode and a metal substrate is well developed. However, such a polymer electrolyte has a problem in that its mechanical stability, namely its strength, is low because the electrolyte is a little bit soft. Especially, such deficiency in strength may cause many problems in the fabrication of an electrode and battery.

A. S. Gozdz et al. discloses a polymer electrolyte of hybrid type polyvinylidenedifluoride (hereinafter referred to as "PVdF") group in U.S. Pat. No. 5,460,904, The polymer electrolyte of the hybrid type PVdF group is prepared by fabricating a polymer matrix having a porosity not greater than submicron, and then injecting an organic electrolyte into the small pores in the polymer matrix. It has the advantages that its compatibility with the organic electrolyte is good, the organic electrolyte injected into the small pores is not leaked so as to be safe in use and the polymer matrix can be prepared in the atmosphere because the organic electrolyte is injected afterwards. However, it has the disadvantages that the fabrication process is intricate because when the polymer electrolyte is prepared, an extraction process of a plasticizer and an impregnation process of the organic electrolyte are required. In addition, it has a critical disadvantage in that a process forming a thin layer by heating and an extraction process are required in fabrication of electrodes and batteries because the mechanical strength of the PVdF group electrolyte is good but its adhesive force is poor.

Recently, a polymer electrolyte of a polymethylmethacrylate (hereinafter referred to as "PMMA") group was presented in *Solid State Ionics*, 66, 97, 105 (1993) by O. Bohnke and G. Frand, et al. The PMMA polymer electrolyte has the advantages that it has an ionic conductivity of $10^{-3}$ S/cm at room temperature and its adhesive force and compatibility with an organic electrolyte are good. However, its mechanical strength is very poor, and accordingly it is unfeasible for the lithium polymer battery.

In addition, a polymer electrolyte of a polyvinylchloride (hereinafter referred to as "PVC") group, which has good mechanical strength and has an ionic conductivity of $10^{-3}$ S/cm at room temperature, was presented in *J. Electrochem. Soc.*, 140, L96 (1993) by M. Alamgir and K. M. Abraham. However, it has problems in that a low-temperature characteristic is poor and a contact resistance is high.

Recently, in order to complement disadvantages of lithium ion batteries and lithium polymer batteries, new methods have been attempted. Among them, U.S. Pat. No. 5,681,357, U.S. Pat. No. 5,688,293 and U.S. Pat. No. 5,834,135 to M. Oliver et al. disclose a fabrication method of a secondary battery. Such method comprises steps of casting a solution in which a polymer such as PVdF, etc. is dissolved in an organic solvent or an organic electrolyte onto a PP or PE separator film used for lithium ion batteries to obtain a separator film system, locating the obtained separator film system between an anode and a cathode, making the resultant into one body by a heat lamination process and then injecting an organic electrolyte solution. However, in the method, because a polymer solution is cast onto a PP or PE separator film, deformation of the PP or PE separator film is caused and pores of the separator film is closed. In addition, contact is insufficient because the separator film and electrodes are made into one body by a heat lamination process, and therefore, a contact resistance may be increased. Due to those disadvantages, charge and discharge characteristics of lithium secondary batteries are poor and life characteristics of batteries may be lowered.

U.S. Pat. No. 5,691,005 and U.S. Pat. No. 5,597,659 to Kenichi Morigaki et al. disclose a method for improving a cycle life of a batteries by restraining the generation of dendrite of lithium when metallic lithium or a lithium alloy is used as an anode. Such effect is achieved by injecting a UV (hereinafter referred to as "UV") curable oligomer or monomer into a PE separator film and then irradiating UV rays onto the resultant, to generate a gel-polymer electrolyte at pores in the PE separator film. However, in such method, although it is possible to improve cycle life, a resistance is increased compared with the one in which an organic electrolyte solution is impregnated into the PE separator film because a polymer electrolyte is injected into the pores of the PE separator film. Accordingly, charge and discharge characteristics of the lithium secondary batteries are lowered. In addition, its adhesive force with an electrode is inferior, and therefore, a fabrication of a battery becomes intricate.

SUMMARY OF THE INVENTION

Therefore, an object of the present invention is to provide a UV-cured polymer electrolyte which is superior in adhesion with electrodes, compatibility with an organic electrolyte for a lithium secondary battery, mechanical strength, permeability, etc.

Another object of the present invention is to provide a lithium secondary battery comprising said electrolyte.

The above and other objects of the present invention can be achieved by providing a polymer electrolyte in which a UV-cured polymer electrolyte having good adhesion with electrodes, good compatibility with an organic electrolyte for a lithium secondary battery, good mechanical strength, good permeability, etc. is coated onto one or both surfaces of a separator film such as a polymer electrolyte, PP, PE, PVdF or a non-woven fabric. In more detail, the above and other objects can be achieved by providing a multi-layered electrolyte comprising:

A) a separator film layer formed of a polymer electrolyte, PP, PE, PVdF or a non-woven fabric;

B) a UV-cured electrolyte layer comprising;

a) a polymer obtained by curing ethyleneglycoldi(meth)acrylate oligomer of formula (I) with an irradiation of UV rays,

$$CH_2=CR^1COO(CH_2CH_2O)_nCOCR^2=CH_2 \quad (I)$$

wherein, $R^1$ and $R^2$ are independently hydrogen or methyl group, and n is an integer of 3–20, and b) at least one polymer selected from the group consisting of PVdF group polymers, PAN group polymers, PMMA group polymers and PVC group polymers; and C) an organic electrolyte solution in which a lithium salt is dissolved in an organic solvent.

DETAILED DESCRIPTION OF THE INVENTION

Figure 1:
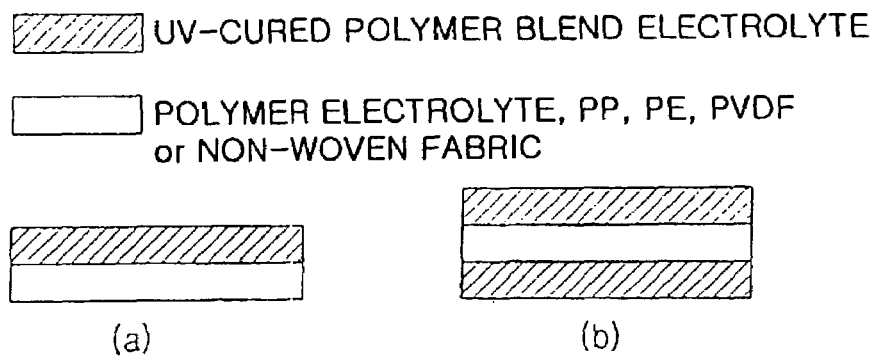
FIG. 1 is cross-sectional views illustrating a multi-layered polymer electrolyte in accordance with the present invention.

The present invention relates to a multi-layered polymer electrolyte and a lithium secondary battery comprising the same, wherein the multi-layered polymer electrolyte comprises:

A) a separator film layer formed of a polymer electrolyte, PP, PE, PVdF or a non-woven fabric;

B) a UV-cured electrolyte layer comprising:

a) a polymer obtained by curing ethyleneglycoldi(meth)acrylate oligomer of formula (I) with an irradiation of UV rays;

$$CH_2=CR^1COO(CH_2CH_2O)_NCOCR^2=CH_2 \quad (I)$$

wherein, $R^1$ and $R^2$ are independently hydrogen or methyl group, and n is an integer of 3–20, and b) at least one polymer selected from the group consisting of PVdF group polymers, PAN group polymers, PMMA group polymers and PVC group polymers; and C) an organic electrolyte solution in which a lithium salt is dissolved in an organic solvent.

The ethyleneglycoldi(meth)acrylate oligomer means ethyleneglycoldiacrylate, ethyleneglycoldimethacrylate or mixtures thereof and has molecular weight of 200–2000, The amount used can be adjusted in the range of 5–95 wt % of the polymer mixture in the polymer layer, in accordance with characteristics required.

It is preferred that the PAN group polymer used in the UV-cured polymer layer is selected from the group consisting of polyacrylonitrile and poly(acrylonitrile-methylacrylate). It is preferred that the PMMA group polymer is selected from the group consisting of polymethylmethacrylate, poly(methylmethacrylate-co-ethylacrylate) and poly(methylmethacrylate-co-methacrylic acid). It is preferred that the PVdF group polymer is selected from the group consisting of polyvinylidene difluoride, poly(vinylidene difluoridehexafluoropropylene). It is preferred that the PVC group polymer is selected from the group consisting of polyvinylchloride and poly(vinyl chloride-coacrylonitrile).

Lithium salts used in the organic electrolyte solution of the present invention are the same as generally used in the lithium secondary batteries. Examples include $LiPF_6$, $LiClO_4$, $LiAsF_6$, $LiBF_4$, $LiCF_3SO_3$ and $Li(CF_3SO_2)_2N$. Among them, $LiPF_6$ is more preferable.

Examples of an organic solvent used in the organic electrolyte may be ethylene carbonate, propylene carbonate, diethyl carbonate, dimethyl carbonate, ethyl methyl carbonate or mixtures thereof. In order to improve the low-temperature characteristic, an additional solvent, such as methyl acetate, methyl propionate, ethyl acetate, ethyl propionate, butylene carbonate, γ-butyrolactone, 1,2-dimethoxyethane, 1,2-dimethoxyethane, dimethylacetamide, tetrahydrofuran or mixtures thereof, can be added to the above organic solvent. The amount of the organic electrolyte solution used is preferably adjusted in the range of 100–2000 wt % of the polymer mixture used in the UV-cured polymer layer.

The multi-layered polymer electrolyte in accordance with the present invention can further comprises an initiator for UV curing, a curing accelerator, a plasticizer, a porous filler, etc., if it is necessary.

As an initiator for UV curing in the present invention, any substances capable of generating a radical by an irradiation of UV rays can be used, and there is no limitation on specific substances. Examples may include 2,2-dimethoxy-2-phenylacetophenone, 2-methoxy-2-phenylacetone, benzyldimethyl-ketal, ammoniumpersulfate, benzophenone, ethyl benzoin ether, isopropyl benzoin ether, α-methyl benzoin ether, benzoin phenyl ether, 2,2-diethoxyacetophenone, 1,1-dichloroacetophenone, 2-hydroxy-2-methyl-1-phenylpropane-1-one, 1-hydroxy cyclohexyl phenyl ketone, anthraquinone., 2-ethylanthraquinone, 2-chloroanthraquinone, thioxantone, isopropyl thioxantone, chlorothioxantone, 2,2-chlorobenzophenone, benzyl benzoate, benzoyl benzoate, etc. The amount of the initiator used is generally in the range of 0.1–5.0 wt % of the total polymers used in the UV-cured polymer layer.

Examples of a curing accelerator which is used for enhancing UV-curing rate may include triethylamine, tributylamine, triethanolamine, N-benzyldimethylamine, etc. The amount of the curing accelerator is generally in the range of 1.0–5.0 wt % of the total polymers used in the UV-cured polymer layer.

Examples of a plasticizer may include N,N-dimethylacetamide (DMA), N,N-dimethylformamide (DMF), dimethyl carbonate (DMC), ethylene carbonate (EC), ethyl methyl carbonate (EMC), propylene carbonate (PC), acetonitrile and mixtures thereof, but not limited thereto. It is preferred that the amount of the plasticizer used in the polymer electrolyte is adjusted in the range of 100–2000 wt % of the total polymers used in the UV-cured polymer layer.

Examples of a filler may include $TiO_2$, $BaTiO_3$, $Li_2O$, LiF, LiOH, $Li_3N$, BaO, $Na_2O$, MgO, $Li_2CO_3$, $LiAlO_2$, $SiO_2$, $Al_2O_3$, PTFE, an organic filler, a polymer filler and mixtures thereof. Such filler improves porosity and mechanical strength of the electrolyte. Generally, the content of the filler is no more than 20 wt % of the total polymers used in the UV-cured polymer layer.

The preparation method of the polymer electrolyte film according to the present invention will be described. After polyethyleneglycol(metha)acrylate oligomer of formula (I), and at least one polymer selected from the group consisting of PVdF group polymers, PAN group polymers, PMMA group polymers, PVC group polymers and mixtures thereof were added to an organic electrolyte solution and/or an organic solvent, the obtained mixture is swollen by heating at 50–150° C. while stirring. It is preferred that the stirring is continued to be mixed enough for at least three hours. After an initiator for UV curing and a curing accelerator were then added to the mixture, the mixture is additionally stirred for 30 seconds or 10 minutes. The resulting mixture is cast onto one or both surfaces of the separator film formed of a polymer electrolyte, PP, PE, PVdF, non-woven fabric, or the like, at a thickness of 20 μm. UV rays are then irradiated onto the surface of the resultant in order to induce curing of the oligomer, to obtain the desired polymer electrolyte film. If it is desirable, an organic electrolyte solution may be additionally added to the obtained polymer electrolyte film. In order to eliminate influences of moisture, it is preferred that all processes are performed under the condition having a moisture concentration of below 10 ppm at room temperature. Curing using the UV rays, heat or electron beam depends largely on the intensity of an energy source, the composition of mixture, the thickness of a film and atmospheric condition.

FIGS. 1a and 1b illustrate cross-sectional structures of a multi-layered, UV-cured polymer electrolyte in accordance with the present invention which is prepared with a UV-cured polymer blend electrolyte. FIG. 1a shows a polymer electrolyte in a double-layered structure in which a UV-cured polymer layer is laminated onto one surface of a separator film such as a polymer electrolyte, PP, PE, PVdF or a non-woven fabric, etc. having good mechanical strength. FIG. 1b shows a polymer electrolyte in a triple-layered structure in which a UV-cured polymer layer is laminated onto both surfaces of a separator film such as a polymer electrolyte, PP, PE, PVdF or a non-woven fabric, etc. having good mechanical strength.

Figure 2:
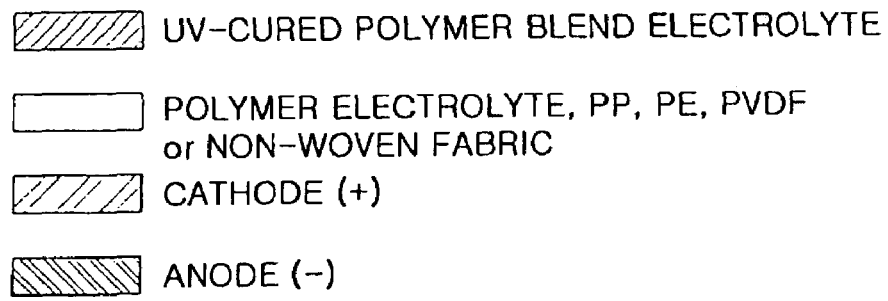
FIG. 2 is cross-sectional views illustrating a lithium secondary battery comprising the multi-layered polymer electrolyte as described in FIG. 1 in accordance with the present invention.

FIG. 2a shows a lithium secondary battery having a mono-cell structure in which a multi-layered polymer electrolyte is located between an anode and a cathode. FIG. 2b shows a lithium secondary battery having a bi-cell structure in which a cathode/a multi-layered polymer electrolyte/an anode/a multi-layered polymer electrolyte/a cathode are stacked in order.

Lithium secondary batteries of the present invention are fabricated as follows. A solution of UV-cured polymer mixture is cast onto one surface or both surfaces of a separator film such as a polymer electrolyte, PP, PE, PVdF and a non-woven fabric, etc. having good mechanical strength at a thickness of 1–50 μm, to obtain a two- or triple-layered, UV-cured polymer electrolyte. The obtained multi-layered, UV-cured polymer electrolyte is adhered onto both surfaces of an anode or a cathode, or inserted between an anode and a cathode, and then the polymer electrolyte and electrode are joined with each other. The resultant are cut so as to be 3 cm=4 cm in size and stacked. The cell is inserted into a vacuum casing, and then an organic electrolyte solution is injected into the vacuum casing to be impregnated into the pores inside the anode, cathode and the separator film. The vacuum casing is then vacuum-sealed to fabricate a lithium secondary battery.

FIG. 3 illustrates an adhesive-lamination process and a stacking process. As shown in FIG. 3, the adhesive-lamination process and the lamination process will be described in detail.

Figure 3A:
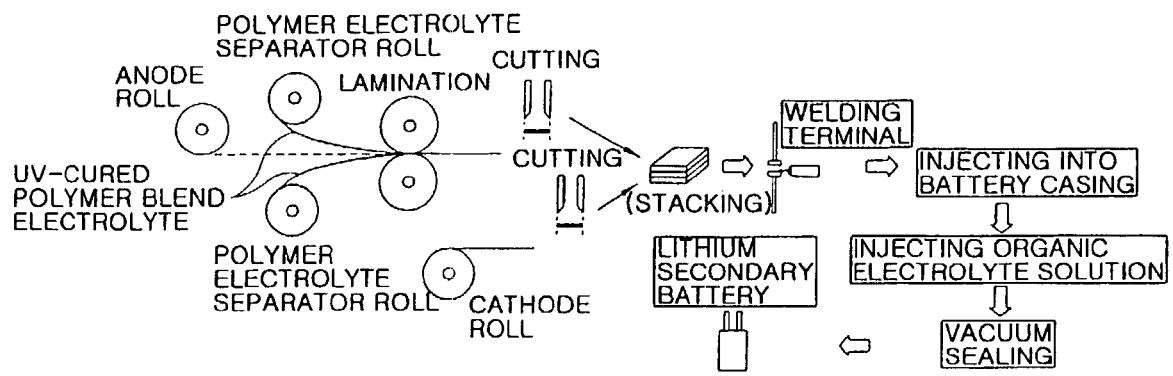
FIGS. 3a–3c are process flow diagrams illustrating fabrication of lithium secondary batteries in accordance with the present invention.

As shown in FIG. 3(a), a solution of UV-curable polymer mixture is cast onto one surface of a separator film such as a polymer electrolyte, PP, PE, PVdF, a non-woven fabric, or the like and irradiating UV rays, to prepare a double-layered polymer electrolyte. The prepared doubled-layered polymer electrolyte is then adhered onto both surfaces of an electrode so that the polymer electrolyte is faced to the electrode. The doubled-layered polymer electrolyte and the electrode are then made into one body by a lamination process. The resultant is then cut to be in a predetermined size, and stacked it with an electrode having opposite polarity to the coated electrode in a predetermined size, to fabricate a lithium secondary battery.

Figure 3B:
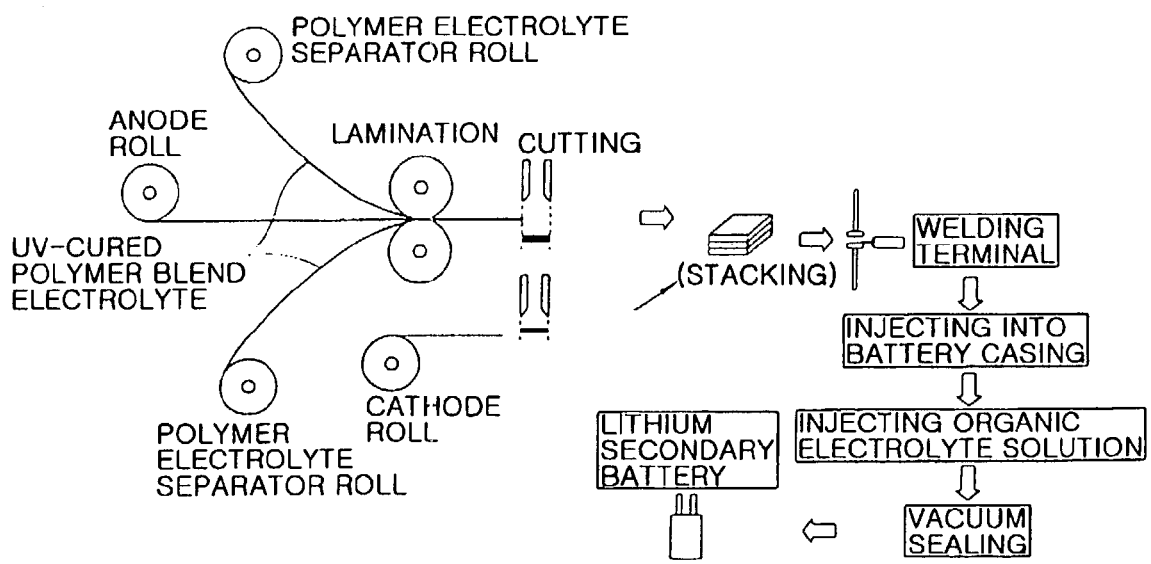

As shown in FIG. 3(b), a solution of UV-curable polymer mixture is cast onto both surfaces of a separator film such as a polymer electrolyte, PP, PE, PVdF, a non-woven fabric, or the like and irradiating UV rays, to prepare a triple-layered polymer electrolyte. The prepared triple-layered polymer electrolyte is then closely adhered onto both surfaces of an electrode, and then the triple-layered polymer electrolyte and the electrode are made into one body by a lamination process. The resultant is then cut to be in a predetermined size, and stacked it with an electrode having opposite polarity to the coated electrode in a predetermined size, to fabricate a lithium secondary battery.

Figure 3C:
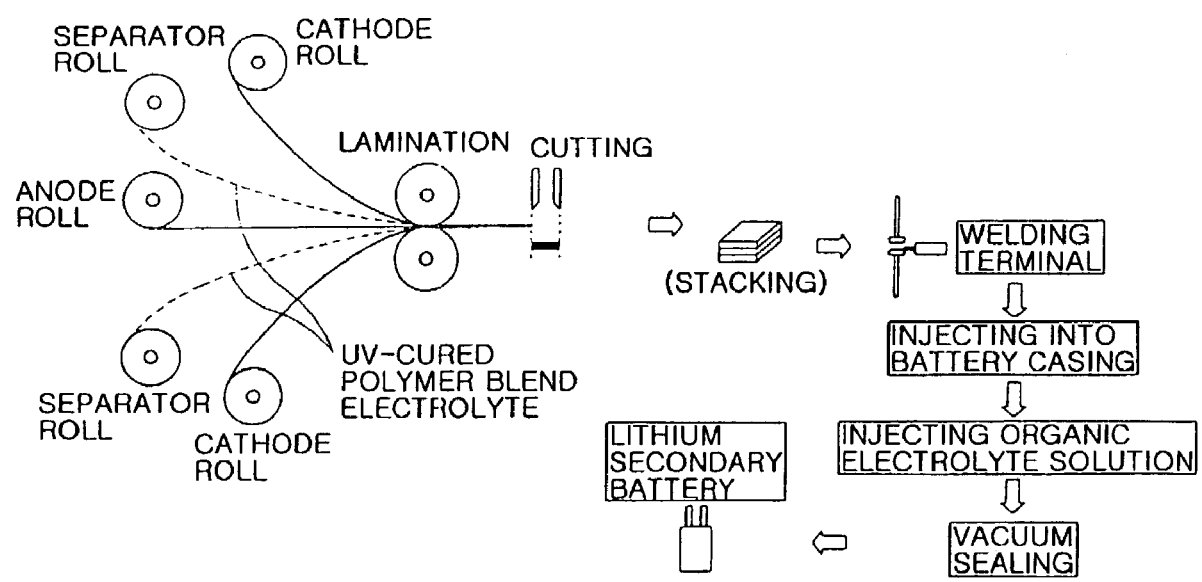

As shown in FIG. 3(c), a solution of UV-curable polymer mixture is cast onto both surfaces of a separator film such as a polymer electrolyte, PP, PE, PVdF, a non-woven fabric, or the like and irradiating UV rays, to prepare a triple-layered polymer electrolyte. The prepared triple-layered polymer electrolyte is closely adhered onto both surfaces of an anode, and then cathodes are adhered outside the polymer electrolyte. A lamination process is performed to make the resultant into one body in a bi-cell structure of cathode/triple-layered, UV-cured polymer electrolyte/anode/triple-layered, UV-cured polymer electrolyte/cathode. The cell is then cut and then stacked to fabricate a lithium secondary battery.

Herein, the anode and cathode are fabricated, as in the conventional art, by mixing an appropriate amount of active materials, conducting materials and binders and an organic solvent, casting the resulting mixture onto both sides of a copper or aluminum foil plate grid, and then drying and rolling. In more detail, an anode consists of at least one material selected from the group consisting of graphite, cokes, hard carbon, tin oxide and lithiated compounds thereof, metallic lithium or lithium alloys. A cathode consists of at least one material selected from the group consisting of $LiClO_2$, $LiNiO_2$, $LiNiCoO_2$, $LiMn_2O_4$, $V_2O_5$ and $V_6O_{13}$.

An organic electrolyte solution used in the fabrication of the battery is a solution selected from the group consisting of a lithium salt-dissolved ethylene carbonate-dimethyl carbonate (EC-DMC) solution, lithium salt-dissolved ethylene carbonate-diethyl carbonate (EC-DEC) solution, lithium salt-dissolved ethylene carbonate-ethylmethyl carbonate (EC-EMC) solution, lithium salt-dissolved ethylene carbonate-propylene carbonate (EC-PC) solution and mixtures thereof, and solutions in which at least one solvent selected from the group consisting of methyl acetate (MA), methyl propionate (MP), ethyl acetate (EA), ethyl propionate (EP), butylene carbonate (BC), γ-butyrolactone (γ-BL), 1,2-dimethoxyethane (DME), dimethylacetamide (DMA) and THF (tetrahydrofuran) is respectively added to the above lithium salt-dissolved solution.

As a copper and aluminum grid, a plate, a punched plate, an expanded plate and a porous plate can be used. If an organic electrolyte solution is injected after stacking, it is preferable to use a punched plate, an expanded plate and a porous plate for efficient electrolyte impregnation.

EXAMPLES

The present invention will be better understood from the below examples, but those examples are given only to illustrate the present invention, not to limit the scope of it.

Example 1

1 g of 5 wt % P(VdF-HFP) (Atochem Kynar 2801) which is a PVdF group polymer in DMC was added to 2 g of liquid electrolyte solution which is a 1M $LiPF_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto one surface of a PE separator film by a doctor-blade method at a thickness of 20 μm. UV rays were then irradiated onto the obtained film with a UV lamp having a power of 100 W to induce a polymerization of the oligomer, to obtain a homogeneous double-layered, UV-cured polymer electrolyte. The obtained double-layered polymer electrolyte was adhered closely onto both surfaces of a graphite anode so as to face the UV-cured polymer electrolyte layer to the graphite anode by a lamination process. The resultant was cut so as to be 3 cm×4 cm in size, and then it was alternately stacked with a $LiCoO_2$ cathode of 2.9 cm×3.9 cm in size. Terminals were welded onto the electrodes and then the cell was inserted into a vacuum casing. A 1M $LiPF_6$ solution in EC-EMC was injected into the vacuum casing, and then the vacuum casing was vacuum-sealed to fabricate a lithium secondary battery.

Example 2

1 g of 5 wt % P(VdF-HFP) (Atochem Kynar 2801) which is a PVdF group polymer in DMC was added to 2 g of liquid electrolyte solution which is a 1M $LiPF_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto both surfaces of a PE separator film by a doctor-blade method at a thickness of 20 μm. UV rays were then irradiated onto the obtained film with a UV lamp having a power of 100 W to induce a polymerization of the oligomer, to obtain a homogeneous triple-layered, UV-cured polymer electrolyte. The obtained triple-layered polymer electrolyte was adhered closely onto both surfaces of a graphite anode so as to face the UV-cured polymer electrolyte layer to the graphite anode by a lamination process. The resultant was cut so as to be 3 cm×4 cm in size, and then it was alternately stacked with a $LiCoO_2$ cathode of 2.9 cm×3.9 cm in size. Terminals were welded onto the electrodes and then the cell was inserted into a vacuum casing. A 1M $LiPF_6$ solution in EC-EMC was injected into the vacuum casing, and then the vacuum casing was vacuum-sealed to fabricate a lithium secondary battery.

Example 3

1 g of 5 wt % P(VdF-HFP) (Atochem Kynar 2801) which is a PVdF group polymer in DMC was added to 2 g of liquid electrolyte solution which is a 1M $LiPF_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto both surfaces of a PE separator film by a doctor-blade method at a thickness of 20 μm. UV rays were then irradiated onto the obtained film with a UV lamp having a power of 100 W to induce a polymerization of the oligomer, to obtain a homogeneous triple-layered, UV-cured polymer electrolyte. After the obtained triple-layered polymer electrolyte was adhered closely onto both surfaces of a graphite anode, a $LiCoO_2$ cathode was adhered onto both surfaces of the resultant, and then the obtained was joined with each other by a lamination process. The resulting plate was cut to be 3 cm×4 cm in size, to obtain a cell having a bi-cell structure. Terminals were welded onto the electrodes and then the cell was inserted into a vacuum casing. A 1M $LiPF_6$ solution in EC-EMC was injected into the vacuum casing, and then the vacuum casing was vacuum-sealed to fabricate a lithium secondary battery.

Example 4

1 g of 5 wt % P(VdF-HFP) (Atochem Kynar 2801) which is a PVdF group polymer in DMC was added to 2 g of liquid electrolyte solution which is a 1M $LiPF_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto both surfaces of a non-woven fabric by a doctor-blade method at a thickness of 20 μm. UV rays were then irradiated onto the obtained film with a UV lamp having a power of 100 W to induce a polymerization of the oligomer, to obtain a homogeneous triple-layered, UV-cured polymer electrolyte. The obtained triple-layered polymer electrolyte was adhered onto both surfaces of a graphite anode so as to face the UV-cured polymer electrolyte layer to the graphite anode by a lamination process. The resultant was cut so as to be 3 cm×4 cm in size, and then it was alternately stacked with a $LiCoO_2$ cathode of 2.9 cm×3.9 cm in size. Terminals were welded onto the electrodes and then the cell was inserted into a vacuum casing. A 1M $LiPF_6$ solution in EC-EMC was injected into the vacuum casing, and then the vacuum casing was vacuum-sealed to fabricate a lithium secondary battery.

Example 5

1 g of 5 wt % solution of a 1:1 mixture by weight of P(VdF-HFP) (Atochem Kynar 2801) which is a PVdF group polymer and polymethylmethacrylate (available from Polyscience Co., molecular weight of 100,000) in DMC was; added to 2 g of liquid electrolyte solution which is a 1M $LiPF_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto one surface of a PE separator film by a doctor-blade method at a thickness of 20 μm. UV rays were then irradiated onto the obtained film with a UV lamp having a power of 100 W to induce a polymerization of the oligomer, to obtain a homogeneous double-layered, UV-cured polymer electrolyte. The obtained double-layered polymer electrolyte was adhered closely onto both surfaces of a graphite anode so as to face the UV-cured polymer electrolyte layer to the graphite anode by a lamination process. The resultant was cut so as to be 3 cm×4 cm in size, and then it was alternately stacked with a $LiCoO_2$ cathode of 2.9 cm×3.9 cm in size. Terminals were welded onto the electrodes and then the cell was inserted into a vacuum casing. A 1M $LiPF_6$ solution in EC-EMC was injected into the vacuum casing, and then the vacuum casing was vacuum-sealed to fabricate a lithium secondary battery.

Example 6

1 g of 5 wt % solution of a 1:1 mixture by weight of P(VdF-HFP) (Atochem Kynar 2801) which is a PVdF group polymer and polymethylmethacrylate (available from Polyscience Co., molecular weight of 100,000) in DMC was added to 2 g of liquid electrolyte solution which is a 1M $LiPF_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto a non-woven fabric a doctor-blade method at a thickness of 20 μm. UV rays were then irradiated onto the obtained film with a UV lamp having a power of 100 W to induce a polymerization of the oligomer, to obtain a homogeneous double-layered, UV-cured polymer electrolyte. The obtained double-layered polymer electrolyte was adhered closely onto both surfaces of a graphite anode so as to face the UV-cured polymer electrolyte layer to the graphite anode by a lamination process. The resultant was cut so as to be 3 cm×4 cm in size, and then it was alternately stacked with a $LiCoO_2$ cathode of 2.9 cm×3.9 cm in size. Terminals were welded onto the electrodes and then the cell was inserted into a vacuum casing. A 1M $LiPF_6$ solution in EC-EMC was injected into the vacuum casing, and then the vacuum casing was vacuum-sealed to fabricate a lithium secondary battery.

Example 7

1 g of 5 wt % P(VdF-HFP) (Atochem Kynar 2801) which is a PVdF group polymer in DMC was added to 2 g of liquid electrolyte solution which is a 1M $LiPF_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto one surface of a PVdF separator film by a doctor-blade method at a thickness of 20 μm. UV rays were then irradiated onto the obtained film with a UV lamp having a power of 100 W to induce a polymerization of the oligomer, to obtain a homogeneous double-layered, UV-cured polymer electrolyte. The obtained double-layered polymer electrolyte was adhered closely onto both surfaces of a graphite anode so as to face the UV-cured polymer electrolyte layer to the graphite anode by a lamination process. The resultant was cut so as to be 3 cm×4 cm in size, and then it was alternately stacked with a $LiCoO_2$ cathode of 2.9 cm×3.9 cm in size. Terminals were welded onto the electrodes and then the cell was inserted into a vacuum casing. A 1M $LiPF_6$ solution in EC-EMC was injected into the vacuum casing, and then the vacuum casing was vacuum-sealed to fabricate a lithium secondary battery.

Example 8

1 g of 5 wt % solution of a 1:1 mixture by weight of P(VdF-HFP) (Atochem Kynar 2801) which is a PVdF group polymer and polymethylmethacrylate (available from Polyscience Co., molecular weight of 100,000) in DMC was added to 2 g of liquid electrolyte solution which is a 1M LiPF$_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto both surfaces of a PP separator film by a doctor-blade method at a thickness of 20 µm. UV rays were then irradiated onto the obtained film with a UV lamp having a power of 100 W to induce a polymerization of the oligomer, to obtain a homogeneous triple-layered, UV-cured polymer electrolyte. The obtained triple-layered polymer electrolyte was adhered closely onto both surfaces of a graphite anode so as to face the UV-cured polymer electrolyte layer to the graphite anode by a lamination process. The resultant was cut so as to be 3 cm×4 cm in size, and then it was alternately stacked with a LiCoO$_2$ cathode of 2.9 cm×3.9 cm in size. Terminals were welded onto the electrodes and then the cell was inserted into a vacuum casing. A 1M LiPF$_6$ solution in EC-EMC was injected into the vacuum casing, and then the vacuum casing was vacuum-sealed to fabricate a lithium secondary battery.

Example 9

1 g of 5 wt % solution of a 1:1 mixture by weight of P(VdF-HFP) (Atochem Kynar 2801) which is a PVdF group polymer and polymethylmethacrylate (available from Polyscience Co., molecular weight of 100,000) in DMC was added to 2 g of liquid electrolyte solution which is a 1M LiPF$_6$ in ethylene carbonate/dimethyl carbonate (1:1 by weight) containing 1 g of polyethyleneglycoldiacrylate oligomer (available from Aldrich Co., molecular weight of 742). The resulting mixture was then sufficiently stirred to be homogeneous at room temperature for at least 3 hours and then cast onto one surface of a gelled PVdF polymer electrolyte (prepared by casting a solution in which PVdF was dissolved in an organic electrolyte solution, as in the conventional method) by a doctor-blade method at a thickness of 20 □m. UV rays were then irradiated onto the obtained film with a UV lamp having a power of 100 W to induce a polymerization of the oligomer, to obtain a homogeneous double-layered, UV-cured polymer electrolyte. The obtained double-layered polymer electrolyte was adhered closely onto both surfaces of a graphite anode so as to face the UV-cured polymer electrolyte layer to the graphite anode by a lamination process. The resultant was cut so as to be 3 cm×4 cm in size, and then it was alternately stacked with a LiCoO$_2$ cathode of 2.9 cm×3.9 cm in size. Terminals were welded onto the electrodes and then the cell was inserted into a vacuum casing. A 1M LiPF$_6$ solution in EC-EMC was injected into the vacuum casing, and then the vacuum casing was vacuum-sealed to fabricate a lithium secondary battery.

Comparative Example 1

Electrodes and separator films were stacked in order of a graphite anode, a PE separator film, a LiCoO$_2$ cathode, a PE separator film and a graphite anode. After terminals were welded onto the electrodes, the cell was inserted into a vacuum casing. A 1M LiPF$_6$ solution in EC-EMC was injected into the casing, and then the casing was vacuum-sealed, to fabricate a lithium secondary battery.

Comparative Example 2

According to the conventional preparation method of a gel-polymer electrolyte, 9 g of 1M LiPF$_6$ solution in EC-DMC was added to 3 g of PAN, and then the resulting mixture was mixed for about 12 hours. After mixing, the mixture was heated at 130° C. for about one hour to generate a polymer electrolyte matrix. When a viscosity of 10,000 cps suitable for casting was obtained, the polymeric solution was cast by die-casting to give a polymer electrolyte film. Electrodes and separator films were stacked in order of a graphite anode, the polymer electrolyte obtained, a LiCoO$_2$ cathode, the polymer electrolyte obtained and a graphite anode. After terminals were welded onto the electrodes, the cell was inserted into a vacuum casing. A 1M LiPF$_6$ solution in EC-EMC was injected into the casing, and then the casing was vacuum-sealed, to fabricate a lithium secondary battery.

Example 10

Test Results

Figure 4:
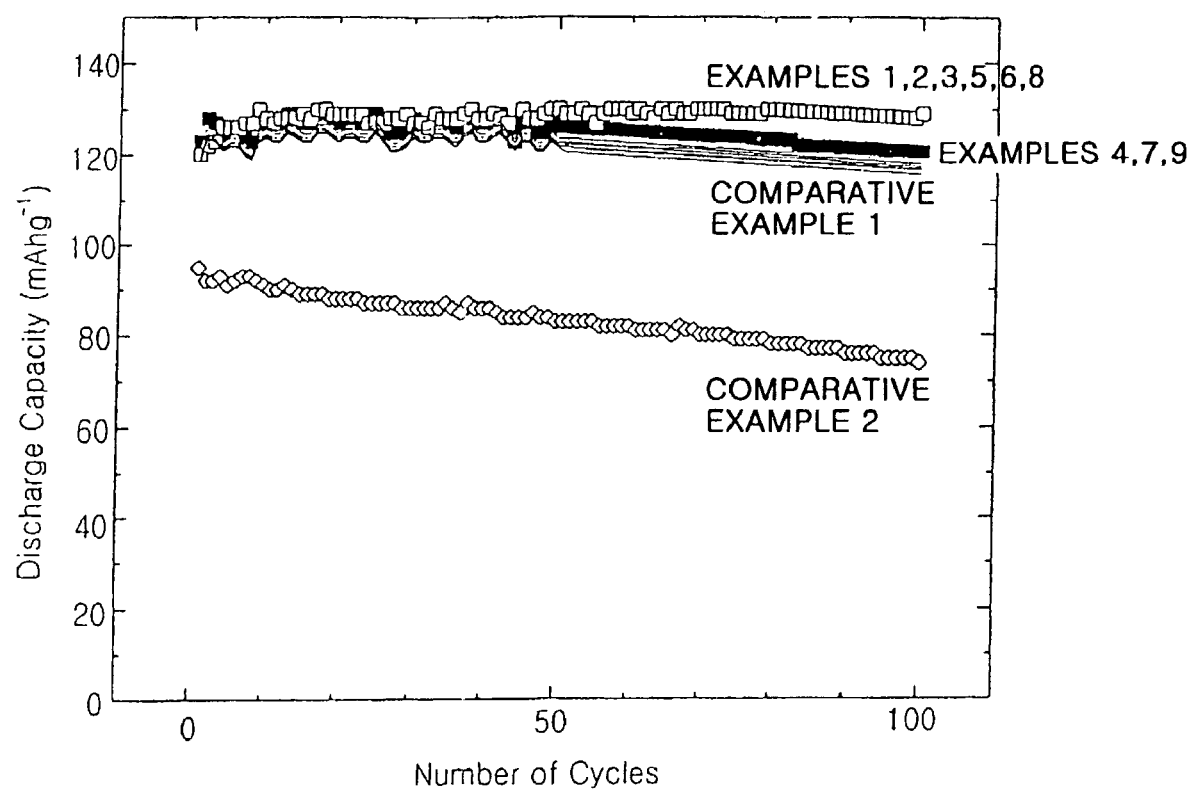
FIG. 4 is a graph showing charge and discharge characteristics of the lithium secondary batteries of Examples 1–9 according to the present invention and Comparative Examples 1 and 2.

Electrode capacities and cycle life based on the cathode of the lithium secondary batteries obtained in Examples 1–9 and Comparative Examples 1 and 2 were examined. These tests were performed with a charge/discharge method of charging the batteries with a C/2 constant current and 4.2V constant voltage, and then discharging with a C/2 constant current. FIG. 4 shows the results.

As shown in FIG. 4, the electrode capacities and cycle life of the lithium secondary batteries of Examples 1–9 comprising the multi-layered polymer electrolyte of the present invention were superior to those of the lithium secondary batteries of Comparative Examples 1 and 2, In addition, the lithium secondary batteries of Examples 1–9 of the present invention exhibited superior characteristics in that their electrode capacities were not reduced regardless of repeated charge, and discharge. Accordingly, it was discovered that the multi-layered polymer electrolyte of the present invention can improve the electrode capacities and cycle life of the lithium secondary batteries. Such improvement seems to be resulted from which surface resistance was reduced because adhesive force between the electrodes and the multi-layered, UV-cured polymer electrolyte were good, and an ionic conductivity of the UV-cured polymer electrolyte layer was also good.

Example 11

Figure 5A:
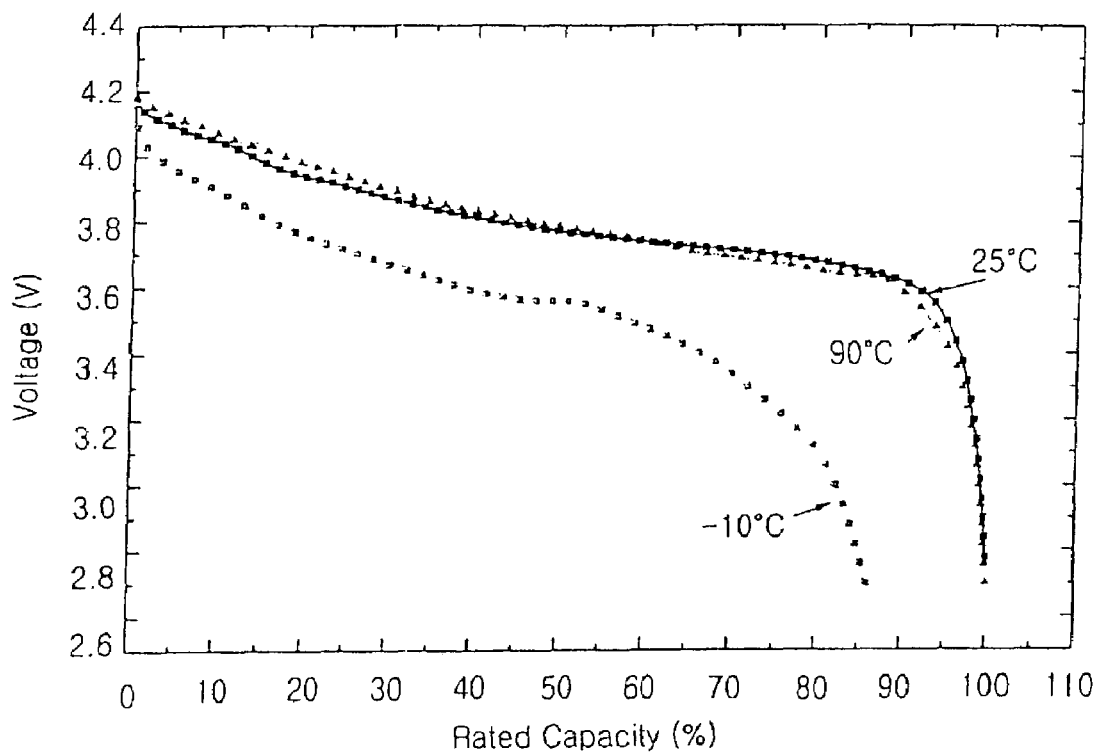
FIG. 5a is a graph showing low- and high-temperature characteristics of the present invention.
Figure 5B:
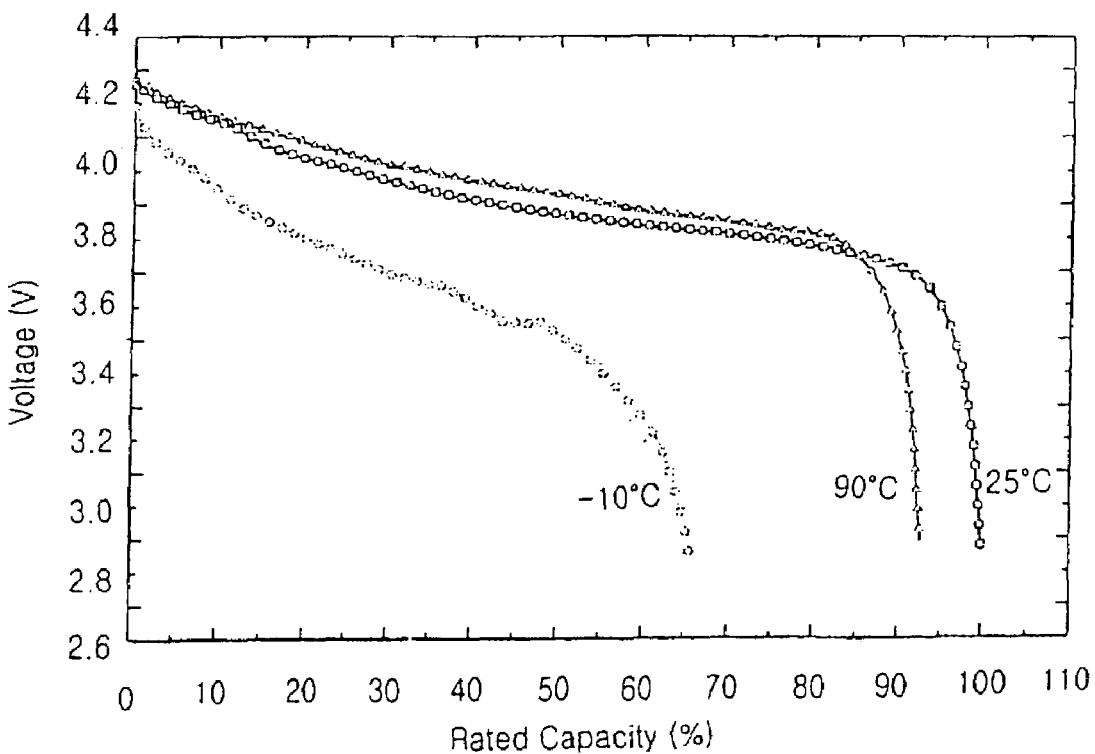
FIG. 5b is a graph showing low- and high-temperature characteristics of the lithium secondary battery Comparative Example.
Figure 6A:
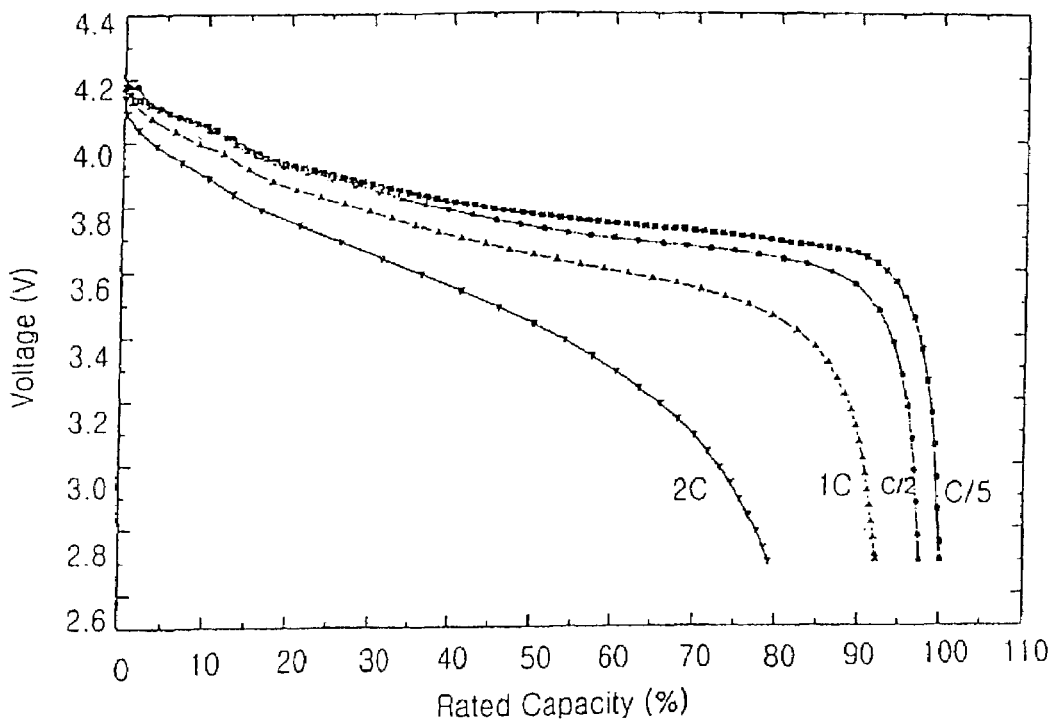
FIG. 6a is a graph showing high-rate discharge characteristics of the lithium secondary battery of the present invention.
Figure 6B:
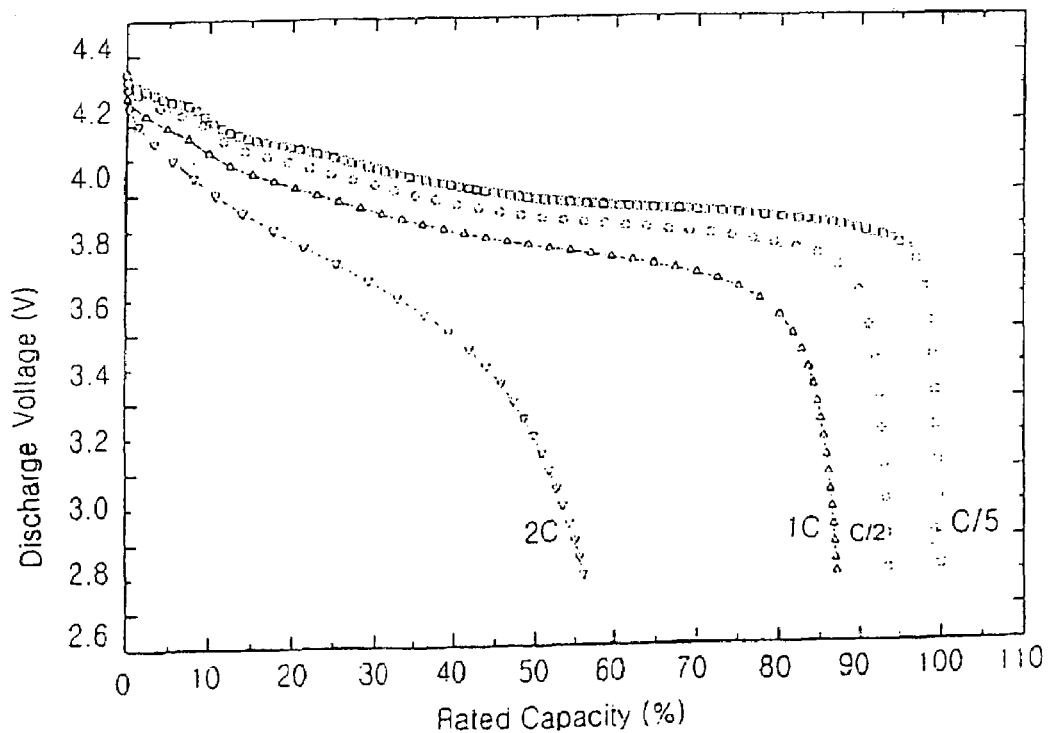
FIG. 6b is a graph showing high-rate discharge characteristics of the lithium secondary battery of Comparative Example.

High rate discharge characteristics of the lithium secondary batteries obtained in Example 2 and Comparative Example 2 were tested. The tests were performed with a charge/discharge method of charging the lithium batteries with a C/2 constant current and 4.2 V constant voltage, and then discharging them while changing the constant current into C/5, C/2,1C and 2C. FIGS. 5a and 5b illustrate the results. As shown in FIGS. 5a and 5b, the lithium secondary battery of the present invention exhibited capacities of 95% and 90% at 1C and 2C discharge, respectively, based on the value of 0.2C discharge (see FIG. 5a). However, the lithium secondary battery of Comparative Example 2 exhibited low capacities of 87% and 56% at 1C and 2C discharge, respectively. Accordingly, it was discovered that the high rate discharge characteristic of the lithium secondary battery comprising the multi-layered, UV-cured polymer electrolyte of the present invention was superior to that of the lithium secondary battery of Comparative Example 2.

INDUSTRIAL APPLICABLITY

The multi-layered, UV-cured polymer electrolyte according to the present invention is superior in adhesive force and mechanical strength to those of the conventional polymer electrolyte. In addition, according to the present invention, a lithium secondary battery showing good performances in low- and high-temperature characteristics, high rate discharge characteristic, capacity of battery, cycle life, stability, etc. can be provided. Accordingly, the lithium secondary battery can be applied in various industrial fields such as small electronic appliances, communicating apparatus and electric automobiles, etc.

The invention claimed is:

1. A multi-layered, UV-cured polymer electrolyte, comprising:
   A) a separator film layer formed of a polymer electrolyte, PP, PE, PVdF or a non-woven fabric;
   B) a UV-cured polymer electrolyte layer comprising:
      a) a polymer obtained by curing (ethyleneglycol)dimethacrylate oligomer of formula (I) with an irradiation of UV rays, $CH_2=CR^1COO(CH_2CH_2O)_NCOCR^2=CH_2$ (I)

wherein, $R^1$ and $R^2$ are independently hydrogen or methyl group, and n is an integer of 3–20, and
      b) at least one polymer selected from the group consisting of PVdF group polymers, PAN group polymers, PVC group polymers and combinations thereof or at least two polymers selected from the group consisting of PVdF group polymers, PAN group polymers, PMMA group polymers PVC group polymers and combinations thereof; and
   C) an organic electrolyte solution in which a lithium salt is dissolved in an organic solvent.

2. The electrolyte according to claim 1, wherein the PAN group polymer is selected from the group consisting of polyacrylonitrile and poly(acrylonitrile-methylacrylate), the PMMA group polymer is selected from the group consisting of polymethylmethacrylate, poly(methylmethacrylate-coethylacrylate) and poly(methylmethacrylate-co-methacrylic acid), the PVdF group polymer is selected from the group consisting of polyvinylidene difluoride, poly(vinylidene difluoride-hexafluoropropylene), and the PVC group polymer is selected from the group consisting of polyvinylchloride and poly(vinyl chloride-co-acrylonitrile).

3. The electrolyte according to claim 1, wherein the lithium salt is selected from the group consisting of $LiPF_6$, $LiClO_4$, $LiAsF_6$, $LiBF_4$, $LiCF_3SO_3$, $Li(CF_3SO_2)_2N$ and combinations thereof.

4. The electrolyte according to claim 1, wherein the organic solvent is selected from the group consisting of ethylene carbonate, propylene carbonate, diethyl carbonate, dimethyl carbonate, ethyl methyl carbonate or mixtures thereof.

5. The electrolyte according to claim 4, wherein the organic solvent further comprises a solvent selected from the group consisting of methyl acetate, methyl propionate, ethyl acetate, ethyl propionate, butylene carbonate, γ-butyrolactone, 1,2-dimethoxyethane, dimethylacetamide, tetrahydrofuran or mixtures thereof, in order to improve a low-temperature characteristic.

6. The electrolyte according to claim 1, wherein the gel-polymer electrolyte layer further comprises at least one substance selected from the group consisting of a plasticizer, a porous filler, an initiator for UV curing and a curing accelerator.

7. The electrolyte according to claim 6, wherein the plasticizer is selected from the group consisting of N,N-dimethylacetamide (DMA), N,N-dimethylformamide (DMF), dimethyl carbonate (DMC), ethylene carbonate (EC), ethyl methyl carbonate (EMC), propylene carbonate (PC), acetonitrile or mixtures thereof.

8. The electrolyte according to claim 6, wherein the porous filler is selected from the group consisting of $TiO_2$, $BaTiO_3$, $Li_2O$, LiF, LiOH, $Li_3N$, BaO, $Na_2O$, MgO, $Li_2CO_3$, $LiAlO_2$, $SiO_2$, $Al_2O_3$, PTFE, an organic filler, a polymer filler and mixtures thereof.

9. The electrolyte according to claim 6, wherein the initiator for UV curing is selected from the group consisting of 2,2-dimethoxy-2-phenylacetophenone, 2-methoxy-2-phenylacetone, benzyl-dimethyl-ketal, ammoniumpersulfate, benzophenone, ethyl benzoin ether, isopropyl benzoin ether, α-methyl benzoin ether, benzoin phenyl ether, 2,2-diethoxyacetophenone, 1,1-dichloroacetophenone, 2-hydroxy-2-methyl-1-phenylpropane-1-one, 1-hydroxycyclohexyl phenyl ketone, anthraquinone, 2-ethyl anthraquitone, 2-chloroanthraquinone, thioxantone, isopropyl thioxantone, chlorothioxantone, 2,2-chlorobenzophenone, benzyl benzoate, benzoylbenzoate and mixtures thereof.

10. The electrolyte according to claim 6, wherein the curing accelerator is an amine compound.

11. The electrolyte according to claim 10, wherein the amine compound is selected from the group consisting of triethylamine, tributylamine, triethanolamine and N-benzyldimethylamine.

12. A lithium secondary battery, comprising a cathode, an anode and an electrolyte according to claim 1.

13. The battery according to claim 12, wherein the cathode comprises at least one cathode active material selected from the group consisting of $LiCoO_2$, $LiNiO_2$, $LiNiCoO_2$, $LiMn_2O_4$, $V_2O_5$ and $V_6O_{13}$.

14. The battery according to claim 12, wherein the anode comprises at least one anode active material selected from the group consisting of graphite, cokes, hard carbon, tin oxide, lithiated compounds thereof, metallic lithium and lithium alloys.

15. The battery according to claim 12, wherein the battery has a mono-cell structure.

16. The battery according to claim 12, wherein the battery has a bi-cell structure.

* * * * *